(12) United States Patent
Jansen et al.

(10) Patent No.: US 11,957,275 B2
(45) Date of Patent: Apr. 16, 2024

(54) PREPARATION VESSEL FOR CONNECTION WITH A RECEIVING AREA OF A BASE UNIT OF A FOOD PROCESSOR

(71) Applicant: Vorwerk & Co. Interholding GmbH, Wuppertal (DE)

(72) Inventors: Sebastian Jansen, Bochum (DE); Christian Bayard, Witten (DE)

(73) Assignee: Vorwerk &Co., Interholding GmbH, Wuppertal (DE)

( * ) Notice: Subject to any disclaimer, the term of this patent is extended or adjusted under 35 U.S.C. 154(b) by 334 days.

(21) Appl. No.: 17/190,784

(22) Filed: Mar. 3, 2021

(65) Prior Publication Data
US 2021/0274975 A1    Sep. 9, 2021

(30) Foreign Application Priority Data

Mar. 6, 2020 (EP) .................................... 20161433

(51) Int. Cl.
*A47J 47/00* (2006.01)
*A47J 43/046* (2006.01)
*A47J 43/07* (2006.01)

(52) U.S. Cl.
CPC ......... *A47J 43/0766* (2013.01); *A47J 43/046* (2013.01); *A47J 43/0727* (2013.01); *A47J 43/0772* (2013.01)

(58) Field of Classification Search
CPC ...... A47J 43/0772; A47J 43/046; A47J 36/10; A47J 43/0716; A47J 43/0761
See application file for complete search history.

(56) References Cited

U.S. PATENT DOCUMENTS

| | | | | |
|---|---|---|---|---|
| 3,786,999 A | * | 1/1974 | Cabell | A47J 43/0777 366/205 |
| 4,297,038 A | * | 10/1981 | Falkenbach | A47J 43/0772 241/37.5 |
| 4,335,860 A | * | 6/1982 | Grandel | A47J 43/046 241/37.5 |
| 6,637,681 B1 | * | 10/2003 | Planca | A47J 43/046 241/37.5 |
| 8,360,480 B2 | * | 1/2013 | Athey | A47J 43/0766 366/205 |
| 9,872,588 B2 | * | 1/2018 | Gushwa | A47J 43/042 |

(Continued)

FOREIGN PATENT DOCUMENTS

EP    2 813 165 B1    9/2015

*Primary Examiner* — Faye Francis
(74) *Attorney, Agent, or Firm* — Collard & Roe, P.C.

(57) ABSTRACT

A preparation vessel is adapted for connection with a receiving area of a base unit of an electric motor-driven food processor. In order to provide a preparation vessel for a food processor that can be locked with a base unit of a food processor regardless of its height, the preparation vessel has a locking assembly for locking the preparation vessel with the base unit of the food processor. The locking assembly has a displaceable contact element, which is arranged on the preparation vessel in such a way that it can be activated by a corresponding activating assembly of the receiving area of the food processor with the preparation vessel in a state properly connected with the base unit, so as to induce the locking of the preparation vessel by means of the locking assembly.

8 Claims, 13 Drawing Sheets

(56) References Cited

U.S. PATENT DOCUMENTS

| | | | | |
|---|---|---|---|---|
| 2008/0035768 A1* | 2/2008 | Ravard | ............... | A47J 43/0772 |
| | | | | 241/37.5 |
| 2011/0013478 A1* | 1/2011 | Athey | ................. | A47J 43/0766 |
| | | | | 366/205 |
| 2013/0264403 A1* | 10/2013 | Thai | ...................... | A47J 43/085 |
| | | | | 366/205 |
| 2016/0158719 A1* | 6/2016 | Gushwa | ................. | B01F 35/51 |
| | | | | 241/299 |
| 2017/0079477 A1* | 3/2017 | Gushwa | .............. | A47J 43/0766 |
| 2019/0000273 A1* | 1/2019 | Sapire | ................... | A47J 43/046 |

* cited by examiner

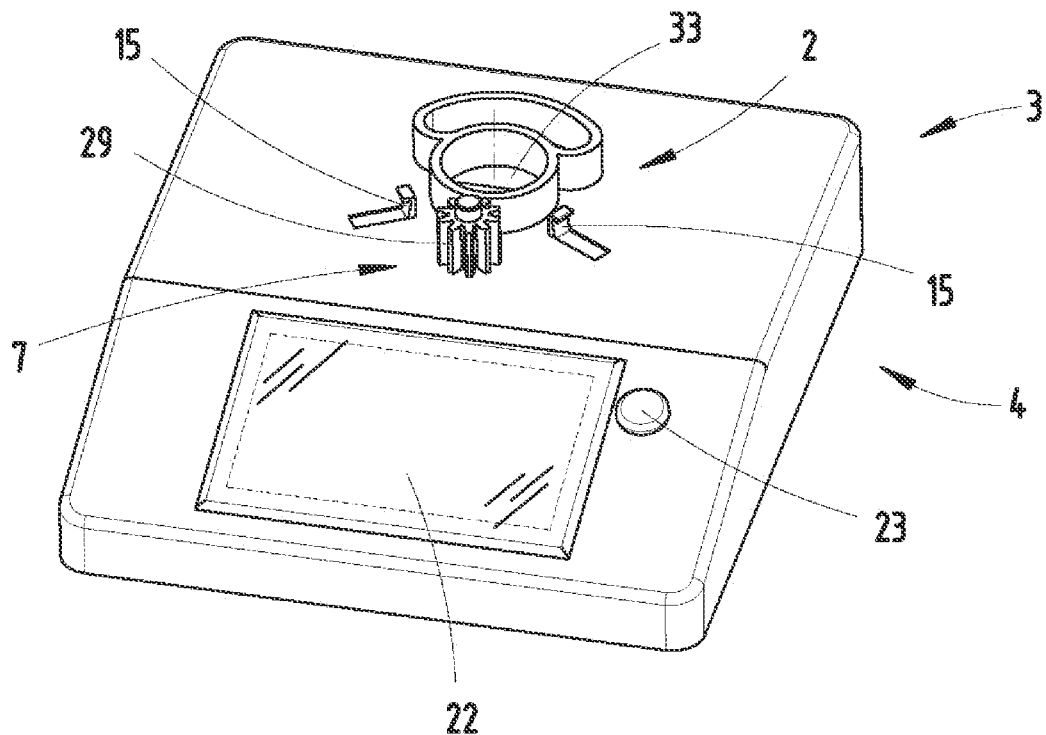
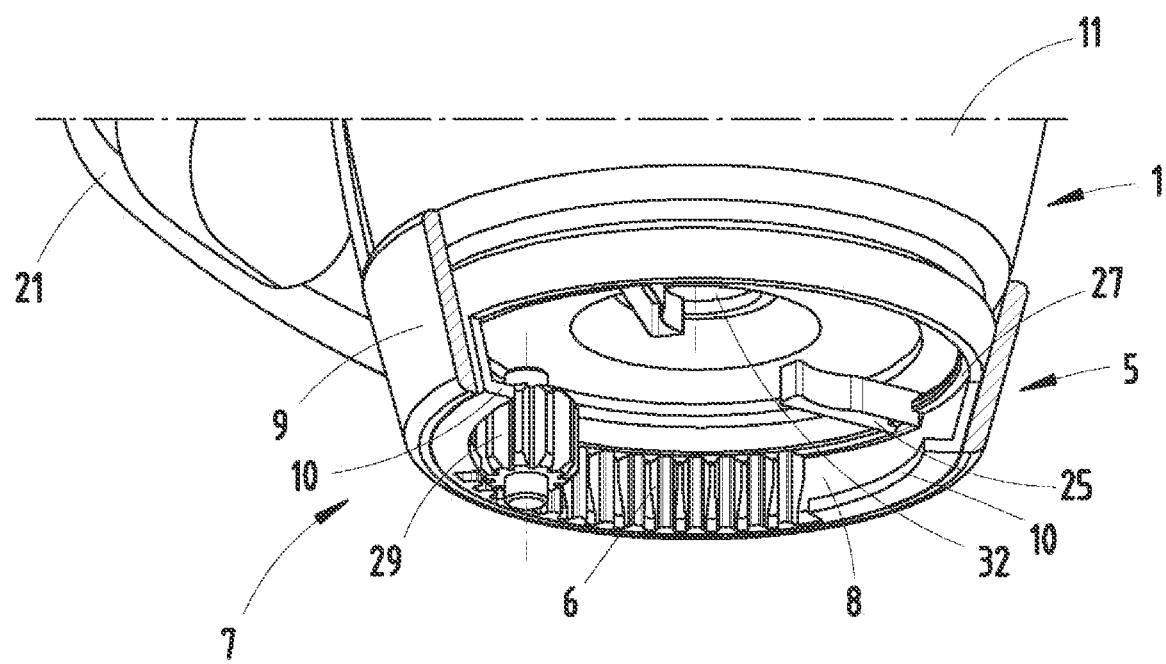

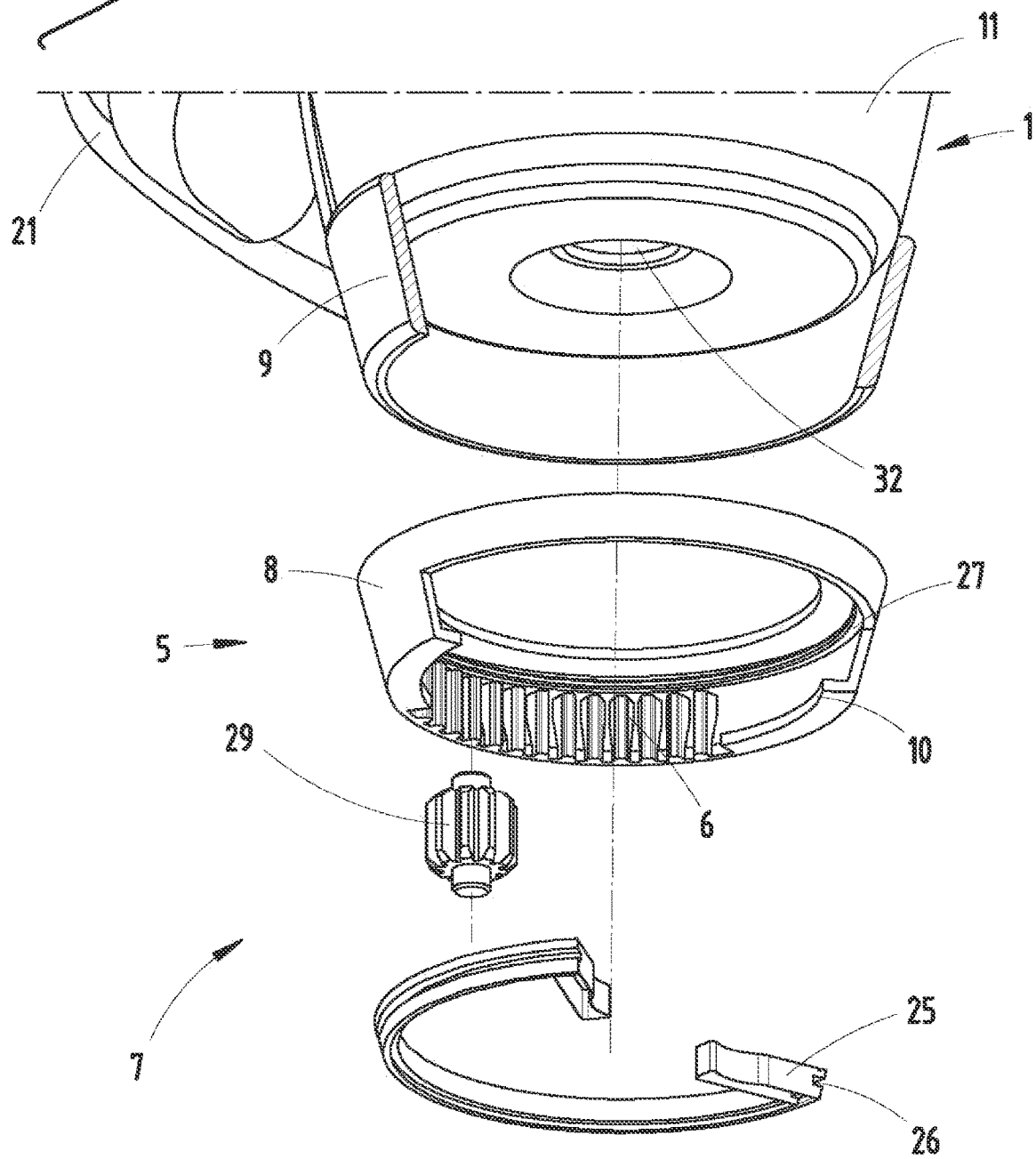

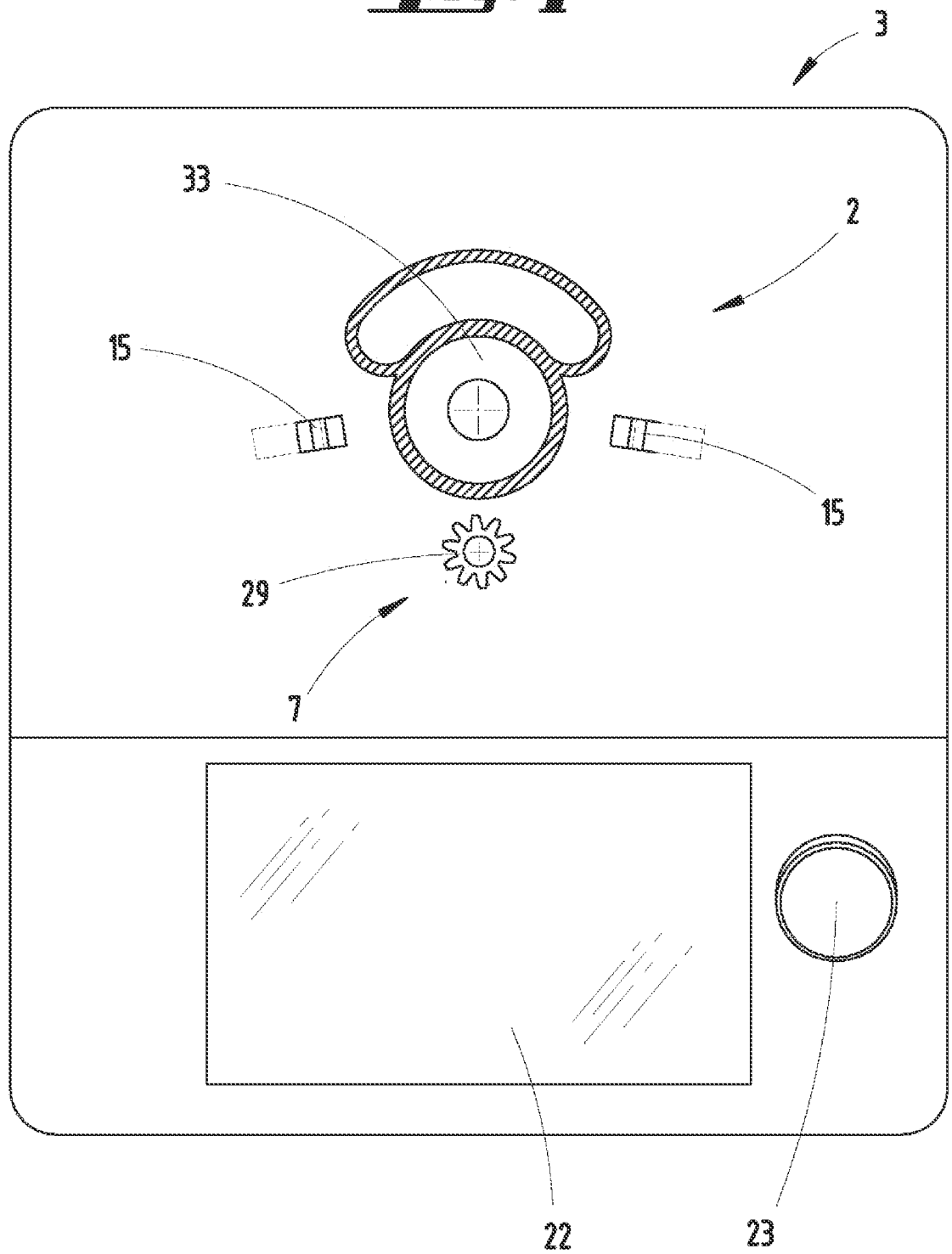

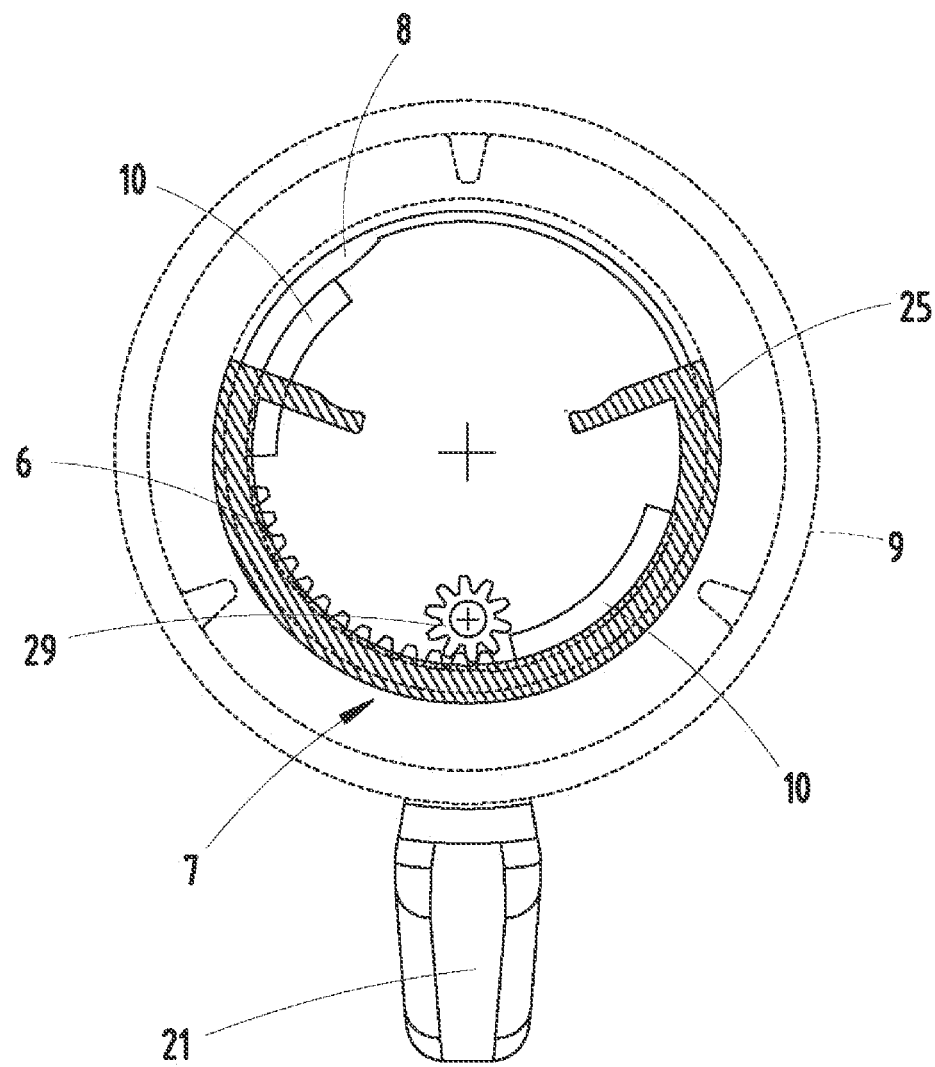

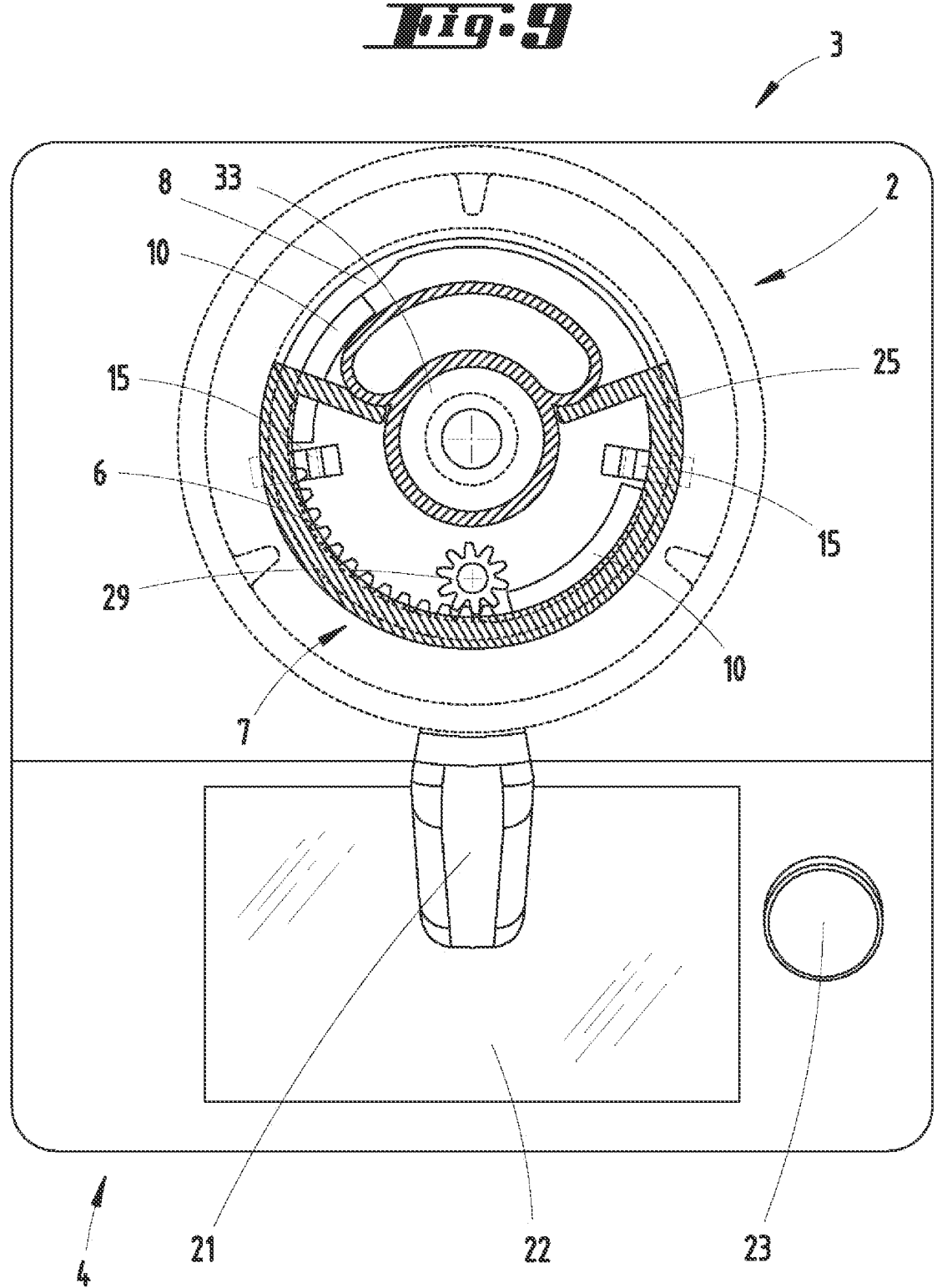

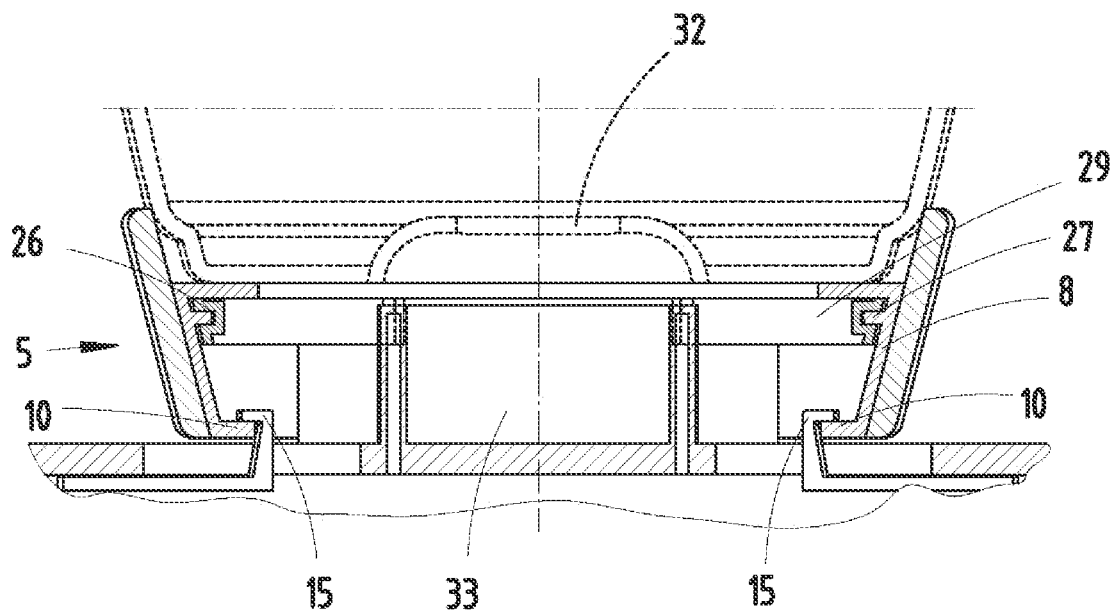
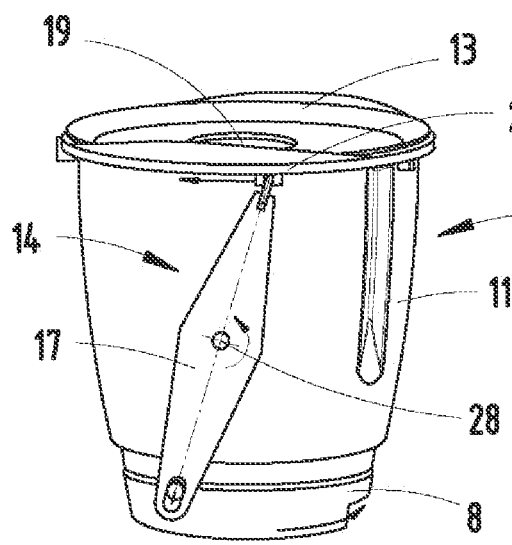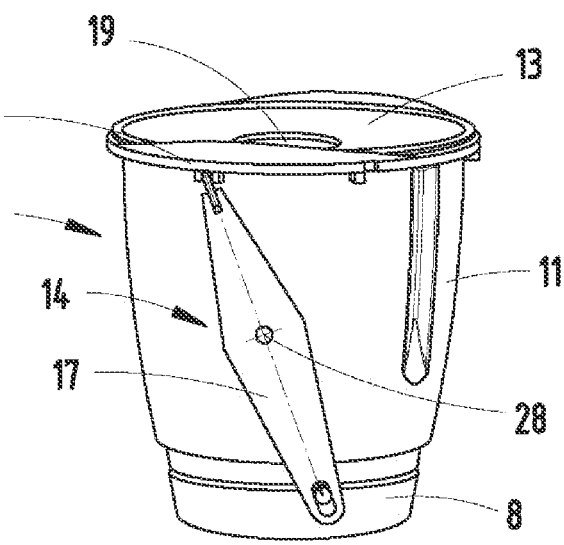

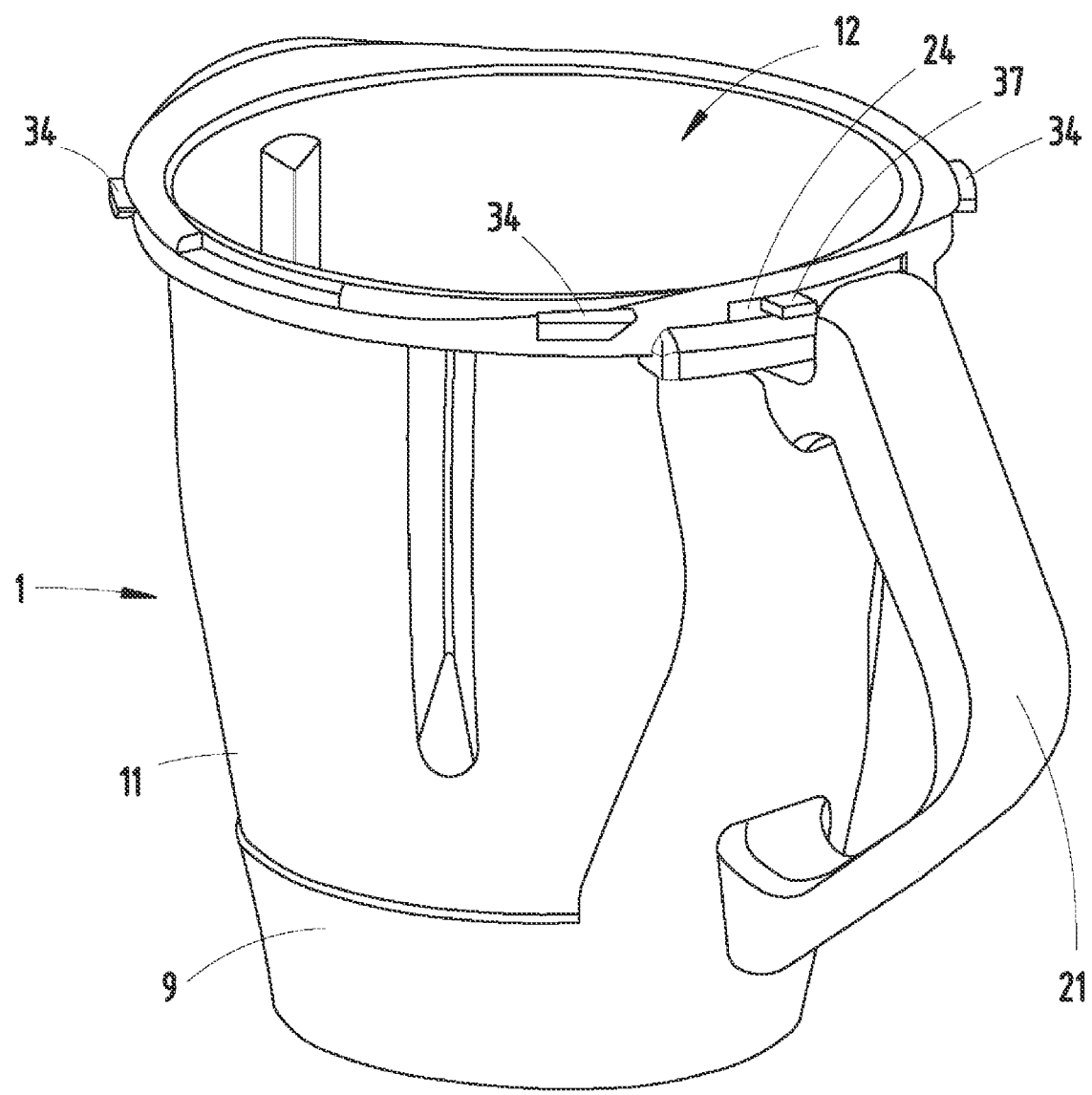

PREPARATION VESSEL FOR CONNECTION WITH A RECEIVING AREA OF A BASE UNIT OF A FOOD PROCESSOR

CROSS REFERENCE TO RELATED APPLICATIONS

Applicant claims priority under 35 U.S.C. §119 of European Application No. 20161433.6 filed on Mar. 6, 2020, the disclosure of which is incorporated by reference.

BACKGROUND OF THE INVENTION

1. Field of the Invention

The invention relates to a preparation vessel for connection with a receiving area of a base unit of an electric motor-driven food processor, wherein the preparation vessel has a locking assembly for locking the preparation vessel with the base unit of the food processor, wherein the locking assembly has a displaceable contact element, which is arranged on the preparation vessel in such a way that it can be activated by a corresponding activating assembly of the receiving area of the food processor with the preparation vessel in a state properly connected with the base unit, so as to induce the locking of the preparation vessel by means of the locking assembly.

The invention further relates to an electric motor-driven food processor, in particular to a mixing device, with a base unit and a preparation vessel that can be connected with a receiving area of the base unit.

2. Description of the Related Art

Preparation vessels and food processors with a preparation vessel are known in the art. For example, the housing of the food processor can have a vessel receiving area, into which the preparation vessel can be inserted, wherein the vessel receiving area is preferably designed at least relative to a partial area corresponding to the preparation vessel in such a way that the preparation vessel can be aligned during connection with the vessel receiving area in relation to both a vertical direction and a peripheral direction of the preparation vessel.

For example, the receiving area can additionally accommodate a drive shaft, which serves to drive an agitator located in the preparation vessel. The agitator is driven by a food processor-side electric motor for preparing meals. In order to preclude foodstuffs from being sprayed out of the preparation vessel during operation of the food processor, in particular the agitator, and prevent a user from reaching into the preparation vessel, the preparation vessel has a cover, for example, which can be locked by means of a locking assembly on the pot.

For example, European Patent No. EP 2 813 165 B1 shows a food processor known in prior art. The food processor has a locking assembly for locking the preparation vessel with a cover, which has two locking parts that overlap a pot edge and cover edge, and are designed as locking rollers that rotate around an essentially horizontal axis. The locking rollers overlap from above to lock the cover onto the pot of the preparation vessel, and also lock the preparation vessel to the base unit of the food processor. The locking rollers can be rotated around an essentially horizontally oriented axis from a release position into a locked position, and vice versa.

Even though such locking assemblies have proven effective for reliable locking purposes, they require that a specific preparation vessel, in particular one matching the height of the locking rollers, also be used with a specific base unit of a food processor. As a result, it might not be possible to use different preparation vessels in conjunction with the food processor, in particular preparation vessels with differing heights.

SUMMARY OF THE INVENTION

Proceeding from the aforementioned prior art, the object of the invention is to further develop a preparation vessel for a food processor.

In order to achieve the aforementioned object, it is proposed that the locking assembly have a locking ring, which has the contact element and is mounted on the preparation vessel so that it can rotate in the peripheral direction of the preparation vessel. In particular, it is proposed that the locking ring be arranged on the bottom side of the preparation vessel in relation to a usual use position of the preparation vessel. For example, the locking ring can be mounted from outside on a peripheral wall of the preparation vessel. In particular when using a pot foot, it is additionally possible that the locking ring be mounted on an inner wall within the pot foot. Given a rotationally symmetrically designed preparation vessel or pot foot, the locking ring and the preparation vessel or pot foot are coaxially aligned relative to each other. Additional embodiments are conceivable in which the locking ring Is not mounted inside or outside on a peripheral wall of the locking [sic] vessel or pot foot. Rather, the locking ring can also be mounted on the bottom side on a floor surface of the preparation vessel or pot foot. Provided in all cases is a fastening element, which mounts the locking ring on the preparation vessel, specifically in such a way as to enable a rotation of the locking ring relative to the preparation vessel. In particular, for example, the locking ring can be mounted on the fastening element or preparation vessel via a tongue-in-groove connection. The locking ring can directly bring about a locked connection between the preparation vessel and base unit, or initially act on an intermediate element which then brings about the locked connection. For example, the locking ring can provide an element of a bayonet lock and/or a connecting link with ramps or the like, wherein the ramps enable in particular an axial displacement of the preparation vessel relative to the base unit. The ramp can be used to additionally push or pull the preparation vessel against the base unit, and in particular tension it so as to maintain the locked position of the preparation vessel relative to the base unit, even at high speeds of the agitator of the food processor.

The locking assembly for locking the preparation vessel with the base unit of the food processor is located on the preparation vessel itself. This eliminates the need for a locking assembly formed on the food processor, which to be properly locked would require a specific geometry, in particular height, of the preparation vessel. The preparation vessel is designed in such a way by the contact element provided on the preparation vessel that the locking assembly can be activated by means of an activating assembly of the food processor receiving the preparation vessel. To this end, the activating assembly of the food processor displaces the contact element of the locking assembly relative to the preparation vessel. The contact element is preferably located on the bottom side of the preparation vessel, so that the latter comes into contact with a corresponding element of the food processor-side activating assembly while connecting the preparation vessel with the receiving area of the base unit. As two separately designed elements, the preparation vessel can have a pot that receives meals to be prepared and a pot foot that can be connected with the pot on the bottom side, wherein the contact element of the locking assembly is preferably formed in or on the pot foot. In this embodiment, the pot of the preparation vessel can be separated from the pot foot, and for example set aside for cleaning in a dishwasher. In any event, it is essential in terms of the invention that the locking assembly belong exclusively to the preparation vessel, and that an interface be provided on the preparation vessel or pot foot that allows the locking assembly of the preparation vessel to be activated by an activating assembly of the food processor. The interface is preferably located under the preparation vessel, preferably in an area of an essentially horizontal contact surface between the receiving area of the base unit and the preparation vessel, in particular the pot foot of the preparation vessel, so that the preparation vessel can have a wide variety of shapes, in particular in terms of its height and/or diameter. This enables a compatibility between various preparation vessels and various base units of a food processor.

For example, a food processor corresponding to the preparation vessel can have an electric motor, which directly drives the contact element of the preparation vessel. Alternatively, the activating assembly of the food processor can also act on the contact element with a gearbox interspersed. For example, the gearbox of the food processor can have one or several toothing elements, for example at least one toothed wheel driven by a drive shaft of the electric motor. The contact element of a preparation vessel transmits the drive force via the locking assembly to an element, which causes the preparation vessel to become locked with the base unit of the food processor.

It is proposed that the locking ring have at least one projection, which is suitable to engage behind a corresponding counter-element of the base unit of the food processor, so as to lock the preparation vessel with the base unit. For example, the projection can point radially inward or outward proceeding from the locking ring. The locking ring especially preferably has several such projections, so as to fix the preparation vessel relative to the base unit on several partial areas. At least three projections are especially preferably suitable for optimally locking the preparation vessel with the base unit. The projection can engage into a corresponding counter-contour of the base unit of the food processor, for example specifically behind a corresponding counter-element. For example, such a counter-element can be designed as a locking hook, below or behind which a projection of the locking ring can be rotated. The projection or the corresponding counter-element is especially preferably also wedge-shaped, in particular designed as a ramp, so as to enable a reliable intermeshing of the two contours and increase the locking force along the rotational path of the locking ring. In order to unlock the projection from the corresponding counter-element, the locking ring is then rotated in the opposite direction, so as to again undo the form closure between the projection and counter-element. In particular, the projection and counter-element can also be partial elements of a bayonet lock, wherein the projection engages into a corresponding opening of the base unit, for example.

In addition, it can be provided that the contact element be a tooth system of the locking ring. In this embodiment, the locking ring can be directly activated by means of the activating assembly of the receiving area of the food processor. For example, the locking ring can at least sectionally have an inner or outer toothing, which can be mechanically contacted by the corresponding activating assembly of the food processor. For example, the activating assembly can on its part likewise have a toothing element, which engages into the tooth system of the locking ring. The locking ring and the activating element of the activating assembly here form a gear drive, which can transmit a driving force of an electric motor of the food processor to the locking assembly of the preparation vessel.

In addition, it is proposed that the preparation vessel have a pot, a cover that closes a pot opening of the pot, and a cover locking assembly for locking the pot with the cover, wherein the cover locking assembly is mechanically operatively connected with the locking assembly in such a way that activating the locking assembly causes the cover locking assembly to be activated. In this embodiment, the locking of the preparation vessel with the base unit of the food processor is also accompanied by a locking between the pot and a cover of the preparation vessel. For this purpose, the locking assembly of the preparation vessel is designed in such a way that it can drive additional movable parts on the preparation vessel, specifically a mechanism for locking the lid with the pot. For this purpose, a coupling element is guided to the interface between the pot and cover proceeding from the locking assembly, specifically in particular the locking ring.

In particular, it is proposed that the cover locking assembly have a functional element that is pivotably connected with the locking ring of the locking assembly, and guided from the locking ring to the pot opening. An alternative embodiment can provide that the cover locking assembly have a rotating shaft that is driven by the locking ring, and guided from the locking ring to the pot opening. In the first embodiment, for example, the functional element can be designed like a kind of activating lever, which is mounted on a pivot axis of a peripheral wall of the preparation vessel. For example, the locking ring can have a tappet for the functional element, via which the functional element pivots around the pivot axis given a rotation of the locking ring, and an end area of the functional element opposite the tappet acts on a cover locking element, so as to lock the cover with the pot. It is especially advantageous that the functional element be at least partially flexible in design, so that it can be deformed to correspond to a shape of the peripheral wall of the preparation vessel during activation. As a result, the functional element can be adjusted to the peripheral wall of the preparation vessel in any of a plurality of pivot positions (from a release position to a locked position of the functional element). In particular, the pivoting path of the functional element required to get from the release position to the locked position can be regulated by the position of the pivot axis on the functional element. For example, the functional element can have two equally long end areas relative to the pivot axis, or even two end areas of varying length. For example, given a preparation vessel that expands in the direction of the pot opening, it can be advantageous to place the pivot axis closer to the locking ring than to the pot opening of the preparation vessel. In the second proposed design, the clover locking assembly can have a rotating shaft driven by the locking ring. In this embodiment, for example, the locking ring has an outer toothing, into which a corresponding tooth system of the rotating shaft engages, and hence corotates during the rotation of the locking ring. For example, the end of the rotating shaft facing away from the locking ring can have a cover locking element, or act on a cover locking element, which then brings about the locking between the cover and the pot of the preparation vessel. Other embodiments are also conceivable, e.g., the cover locking assembly can have several mechanically interacting drive elements arranged one after the other from the locking ring to the pot opening, for example toothed elements, which mesh into each other and thus convert the rotational motion of the locking ring into a movement of the cover locking element that ultimately leads to a locking of the pot with the cover. In particular, use can be made of a gear drive, which has several mechanically intermeshing toothed wheels.

In addition, it is proposed that the cover locking assembly have a cover locking element that is designed to engage behind a partial area of the cover and/or displace the cover relative to the pot, and thereby bring about a locking of the pot with the cover. In particular, the cover locking element can be mechanically operatively connected with the aforementioned pivotable functional element or the rotating shaft. In particular, it is proposed that the cover locking element be a cover locking ring that is rotatably mounted on the pot, envelops the pot opening, and can enter into a bayonet connection with a partial area of the cover. This cover locking ring envelops the pot opening, and is preferably fixed in relation to an axial direction of the preparation vessel, so that the cover locking ring can rotate around the pot opening, but retains its axial position relative to the pot opening. However, a slight axial movement play can be permitted to facilitate the rotation of the cover locking ring. The cover locking ring is rotated by activating the locking assembly, as described previously. For example, the cover locking ring can itself directly bring about a locking between the pot and cover, or initially act on an intermediate element, which then brings about the locking. For example, the cover locking ring can provide an element of a bayonet lock and/or a connecting link with ramps or the like, which enable in particular an axial displacement of the cover relative to the pot. As a result, the cover can be pushed or pulled onto the pot, and in particular tensioned in such a way as to ensure a fluid-tight locking of the pot. For example, the cover locking element can alternatively also be designed as a displaceable, in particular pivotable, hook, which engages behind a partial area of the cover. In addition, the cover locking element can be elastically deformable, for example. The shape of the cover locking element can thus be changed through elastic deformation, wherein the cover locking element can grip onto the cover upon deformation and lock it with the pot. It can advantageously also be provided that the cover locking element be guided by a guiding assembly of the pot, which induces an elastic deformation of the cover locking element, so that at least two defined positions can be reached, specifically an unlocked position and a locked position.

It can further be provided that the functional element or rotating shaft have a rodlike design with a predominately longitudinal extension, wherein the functional element or rotating shaft is guided in particular via a wall of the pot and/or a pot handle of the pot. The rodlike design of the functional element or rotating shaft enables the guidance via the wall of the pot or the pot handle. The elongated shape allows the functional element or rotating shaft to be guided from the locking ring to the pot opening, wherein relatively large distances can also be overcome without requiring numerous individual parts for transmitting the mechanical force. In particular, this can yield an embodiment in which all elements of the cover locking assembly are integrated into the housing of the preparation vessel, and do not protrude to the outside, where a user of the preparation vessel could injure him/herself or residual foodstuffs or dirt can be deposited. Last but not least, this also makes it easier to clean the preparation vessel. A cavity can be provided in the wall of the pot or in the pot handle, inside of which the functional element or rotating shaft extends. The functional element or rotating shaft can then act on the cover locking element in the area of the pot opening.

Apart from the preparation vessel described above, the invention further proposes an electric motor-operated food processor, in particular a mixing unit, which has a base unit and a preparation vessel that can be connected with a receiving area of the base unit, which is designed according to one of the embodiments described above, wherein the base unit has an activating assembly that is set up to activate the locking assembly of the preparation vessel via the contact element of the locking assembly with the base unit and preparation vessel connected with each other. As already explained previously in relation to the preparation vessel, the locking assembly is an assembly of the preparation vessel itself. The electric motor-operated food processor itself provides no locking elements that fix the preparation vessel on the base unit of the food processor. However, the base unit of the food processor has the activating assembly, which serves to activate the locking assembly of the preparation vessel. For this purpose, an activating element of the base unit advantageously engages below the preparation vessel, so as to activate the contact element of the food processor. For example, the activating element of the base unit can be a drive pinion, which moves or displaces the contact element of the preparation vessel. The additional features and advantages of the food processor further arise as explained previously in relation to the preparation vessel. This results in a food processor that can be operated with a plurality of differently designed preparation vessels. In particular, the proper function of the food processor no longer depends on a specific height of a preparation vessel. Rather, the preparation vessel of the food processor now provides its own locking assembly, so that the base unit of the food processor need not have a locking assembly for the preparation vessel. The pot of the preparation vessel can further and in particular have a plurality of varying heights, and still be connected with the base unit in such a way that the cover can also be optimally locked with the pot, for example. In any event, the pot is designed in such a way as to have a contact element for activating the locking assembly via an activating element of the base unit of the food processor, wherein an activating assembly arranged in the base unit can correspondingly bring about a locking of the preparation vessel with the base unit. The base unit preferably has as the activating assembly an electric motor with an allocated gearbox, which acts on the contact element of the locking assembly of the preparation vessel, and thereby initiates a locking of the preparation vessel with the base unit or additionally also a locking of a cover on the pot of the preparation vessel.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 4 is a perspective top view of the food processor;

FIG. 5 is a magnified view of a pot foot of the preparation vessel according to FIG. 3;

FIG. 6 is an exploded view of a pot foot with a locking assembly;

FIG. 7 is a top view of a receiving area of the food processor;

FIG. 8 is a cross section through the pot foot of the preparation vessel;

FIG. 9 is a cross section through the pot foot of the preparation vessel with connection to the receiving area of the food processor in a release position of a locking assembly;

FIG. 11 is the pot foot according to section line XI on FIG. 10;

FIG. 12 is a preparation vessel with a cover locking assembly in a release position;

FIG. 13 is the preparation vessel according to FIG. 12 with the cover locking assembly in a locked position;

FIG. 14 is the preparation vessel with a slidable cover locking element;

FIG. 15 is the preparation vessel with the cover put on;

DETAILED DESCRIPTION OF PREFERRED EMBODIMENTS

Figure 1:
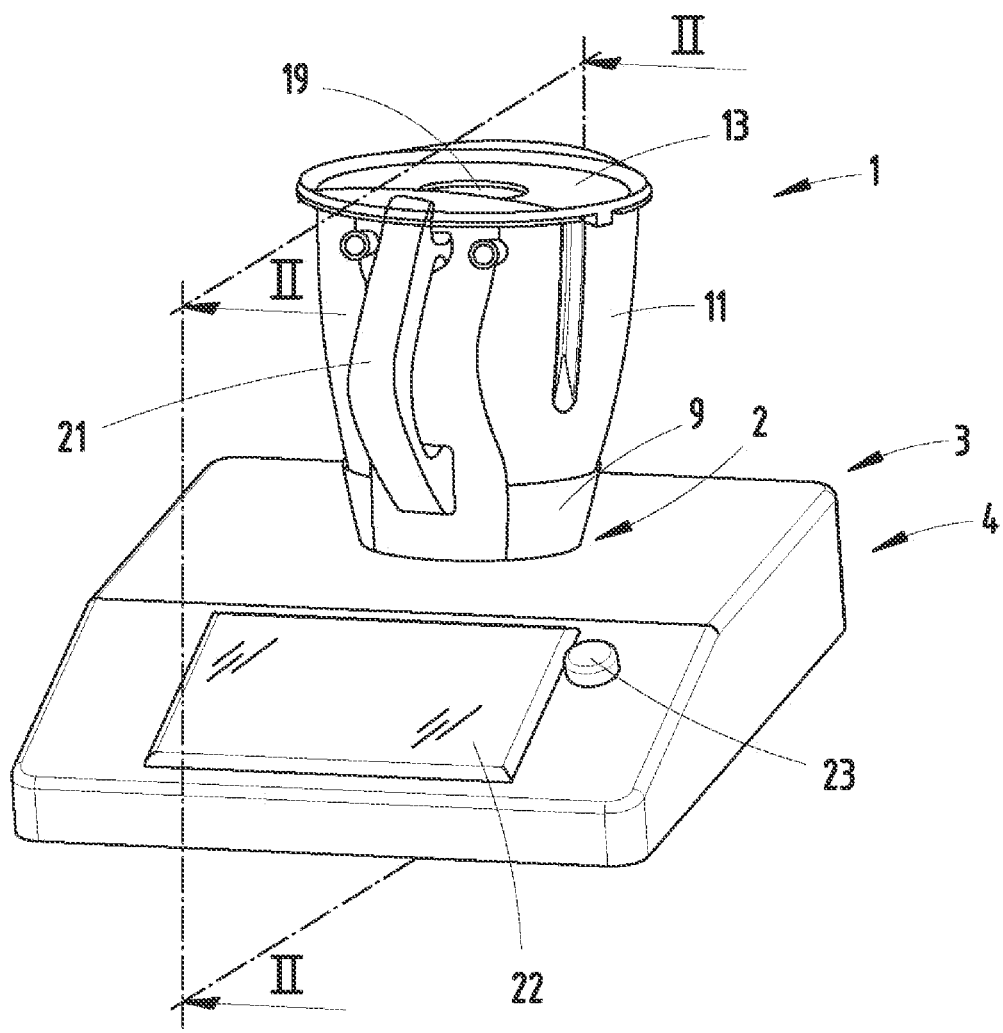
FIG. 1 is a food processor with a preparation vessel.

FIG. 1 shows a food processor 4 with a base unit 3, which has a receiving area 2 for connection with a preparation vessel 1. For example, the base unit 3 is here especially flat in design, wherein the preparation vessel 1 essentially stands only on the base unit 3, but is not enveloped by the latter. The base unit 3 of the food processor 4 has a display 22 for displaying functions of the food processor 4 and possibly recipes that can be prepared with the food processor 4. Located next to the display 22 is a switch 22, which serves to turn the food processor 4 on and off on the one hand, and to activate input commands or the like on the other. The preparation vessel 1 has a pot 11 with a pot handle 21 and a pot foot 9, which is used for connection with the receiving area 2 of the food processor 4, as well as a cover 13 that closes a pot opening 12 of the pot 11 and has a cover opening 19. For example, ingredients can be introduced into the pot 11 of the preparation vessel 1 through the cover opening 19.

Figure 2:
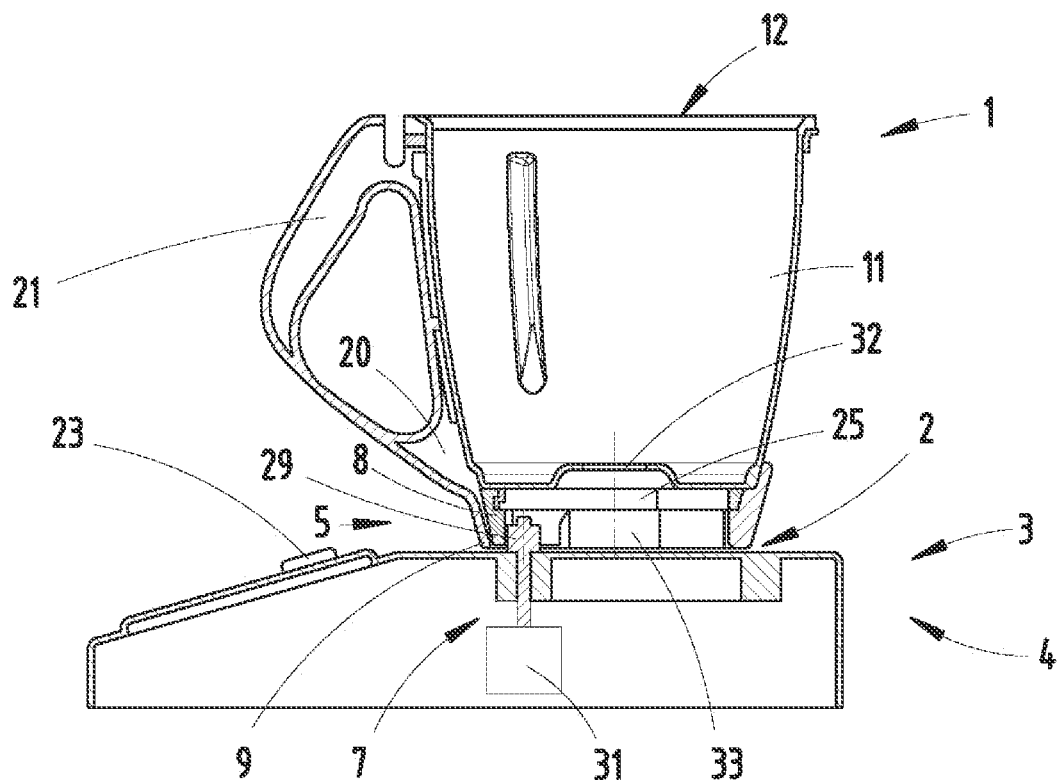
FIG. 2 is a longitudinal section through the food processor and the preparation vessel.
Figure 3:
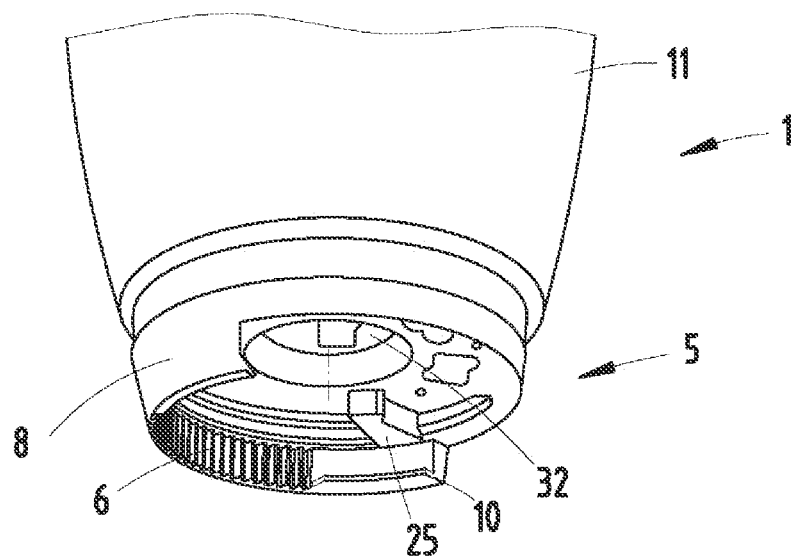
FIG. 3 is a perspective bottom view of the preparation vessel.

FIG. 2 shows a longitudinal section through the preparation vessel 1 and the food processor 4. The preparation vessel 1 has a wall 20, which is here designed with a cavity, for example. The receiving area 2 of the food processor has a housing opening 33 for an agitator (not depicted) to pass through. For example, the agitator can carry a set of blades, which protrudes into the preparation vessel 1 and can there comminute, mix and/or knead meals. The agitator is usually driven by an electric motor (also not depicted). The agitator is guided into the interior of the preparation vessel 1 through a passage opening 32 of the preparation vessel 1 that corresponds to the housing opening 33 of the base unit 3. The base unit 3 of the food processor 4 further has an activating assembly 7 with an activating element 29, which is here designed like a rotatable drive pinion. The drive pinion is rotated by means of an electric motor 31 of the food processor 4. On the pot foot 9, the preparation vessel 1 has a locking assembly 5 with a ring 8, which is rotatably mounted on an inner wall of the pot foot 9. The locking ring 8 is held on the pot 11 by a fastening element 25. The fastening element 25 here—as depicted on FIGS. 5 and 6—exemplarily has a groove 26, into which a ring 27 of the locking ring 8 engages. For example, the fastening element 25 can be fastened to a lower side of the pot 11 by means of a screw or latching connection. The locking ring 8 inwardly has a contact element 6 in the form of a tooth system, which meshes with the tooth system of the activating element 29 of the activating assembly 7 of the food processor 4. Also formed on the locking ring 8 are two radially inwardly facing projections 10, which extend in the peripheral direction of the locking ring 8 over defined peripheral sections. Even more projections 10 (or just one) can also be provided.

FIG. 4 shows the receiving area 2 of the food processor in detail. Apart from the activating element 29 of the activating assembly 7 and the housing opening 33 for the agitator to pass through from the base unit 3 of the food processor 4, the receiving area 2 accommodates two counter-elements 15 for interacting with the projections 10 of the locking ring 8 of the preparation vessel FIG. 6 shows an exploded view of the lower partial area of the preparation vessel 1 with the pot foot 9, the locking assembly 5, the activating element 29 of the food processor 4 and the fastening element 25.

Figure 10:
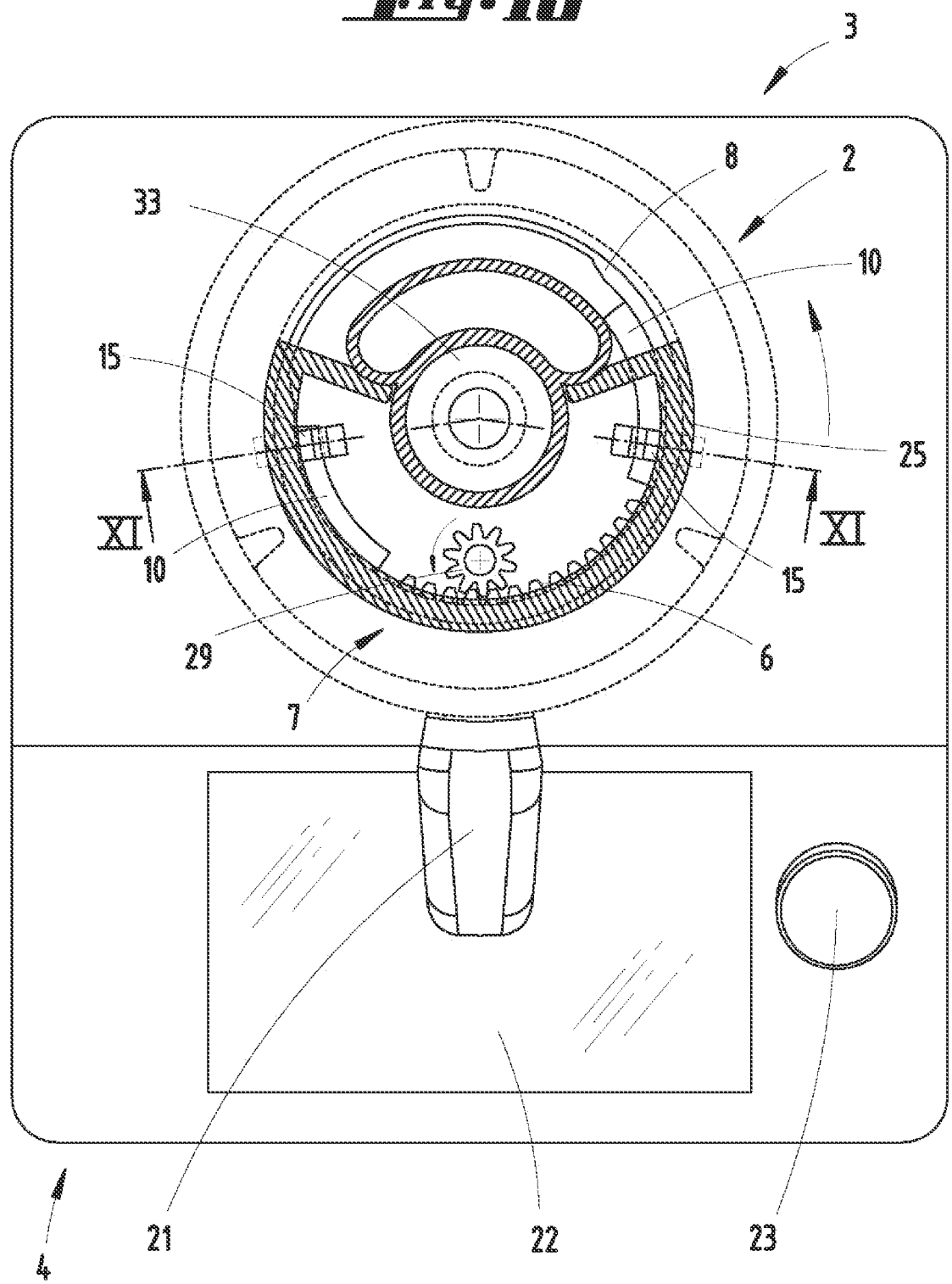
FIG. 10 is the preparation vessel and food processor according to FIG. 9 in a locked position of the locking assembly.
Figure 15:
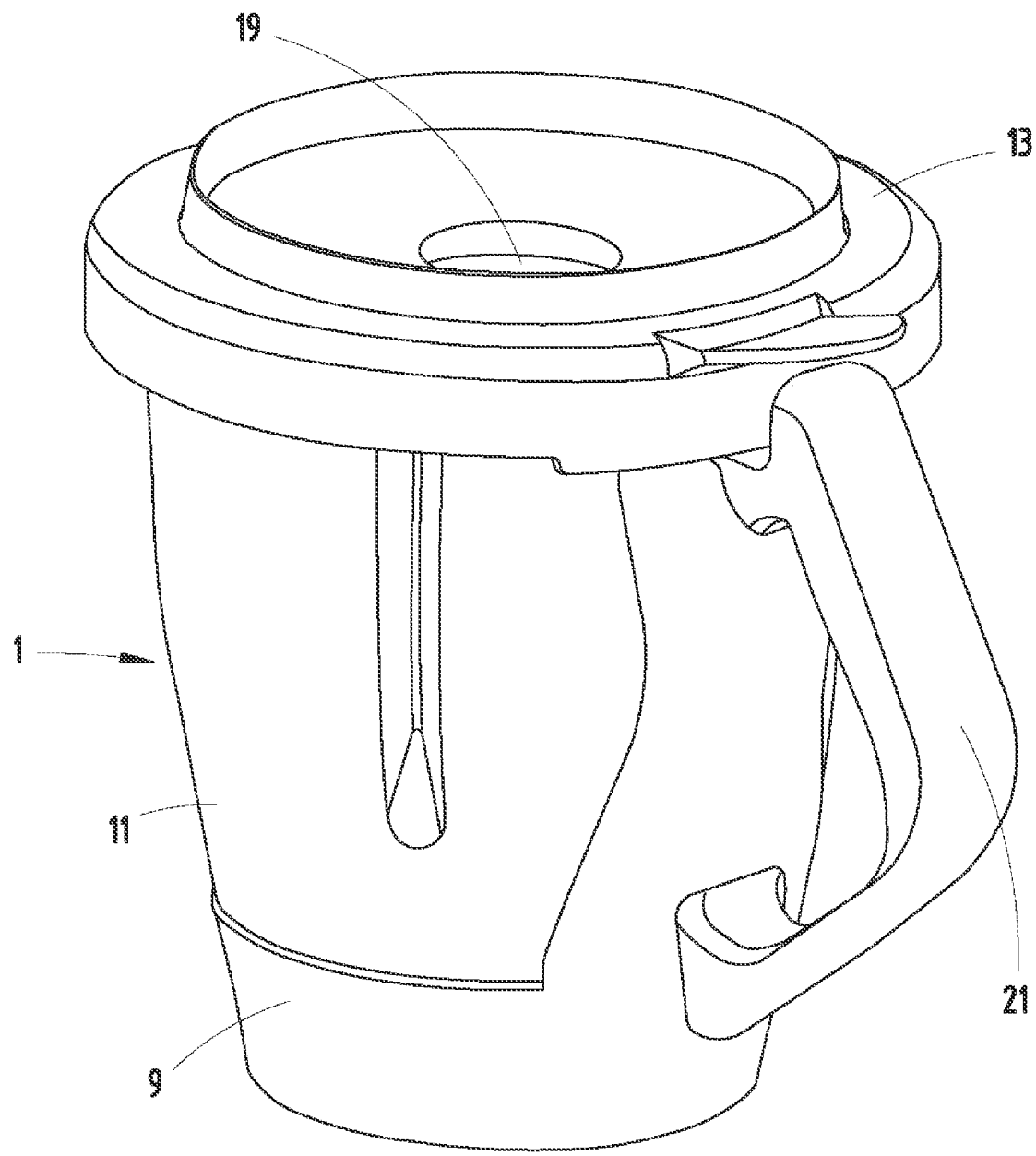
Figure 16:
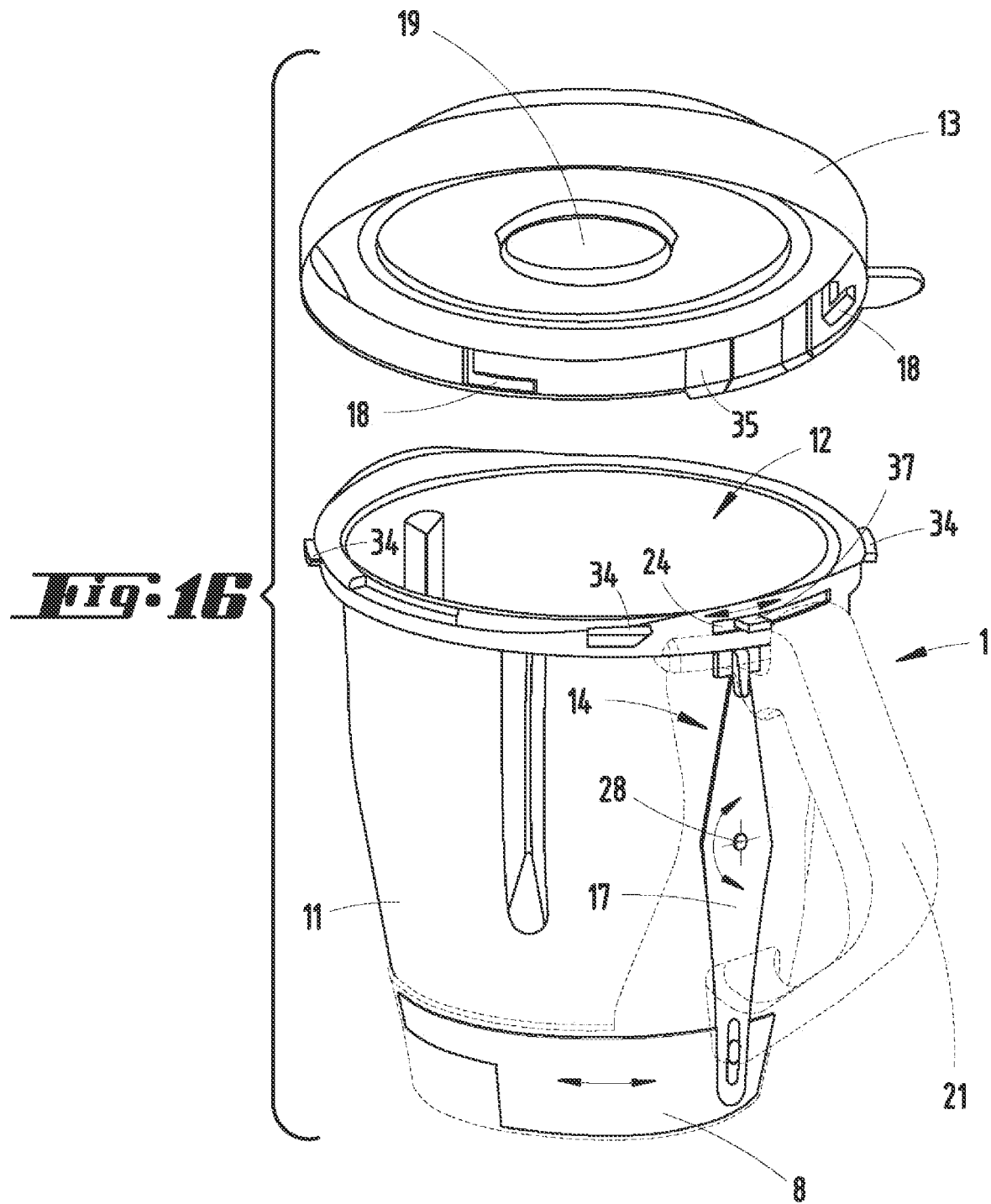
FIG. 16 is the preparation vessel with the cover taken off.

FIGS. 7 to 10 show different views of the receiving area 2 of the food processor 4 or the pot foot 9 of the preparation vessel 1. FIG. 7 shows a top view of the receiving area 2 of the base unit 3 without an arranged preparation vessel 1. FIG. 8 shows a section through the pot foot 9 of the preparation vessel 1 with the locking ring 8, which was fastened by means of the fastening element 25, and whose toothed contact element 6 meshes with a tooth system of the activating element 29 of the base unit 3 of the food processor 4. FIGS. 9 and 10 show different locking states of the locking assembly 5 of the preparation vessel 1. FIG. 9 shows a release state, in which the projections 10 are located next to the counter-elements 15 of the receiving area 2 of the food processor 4 in the peripheral direction of the locking ring 8. In this release position, the preparation vessel 1 can be lifted from the receiving area 2 without the projections 10 being held back by the counter-elements 15. By contrast, FIG. 10 shows a locking state in which the hooked counter-elements 15 grip over the projections 10 of the locking ring 8, and prevent the preparation vessel 1 from being axially lifted from the food processor 4. In this position, the preparation vessel 1 is securely fixed on the base unit 3 of the food processor 4.

FIG. 11 shows a longitudinal section through a lower partial area of the preparation vessel 1 along line XI according to FIG. 10. Discernible there is how the counter-elements 15 grip over the projections 10.

The invention according to FIGS. 1 to 11 functions in such a way that a user places the preparation vessel 1 with the pot foot 9 onto the receiving area 2 of the food processor, specifically in such a way that the housing opening 33 of the receiving area 2 and the passage opening 32 of the preparation vessel 1 for the agitator are coaxially aligned, i.e., lie one over the other. In a correct alignment, the fastening element 25 fastened to the lower side of the pot 11 wraps itself around a contour of the receiving area 2, which borders the housing opening 33 (and here also a passage for electrical connections not depicted in any further detail). For example, the user can then manually start an operation of the locking assembly 5, so as to fix the preparation vessel on the base unit 3 of the food processor 4. Alternatively and preferably, a contact switch can be provided on the receiving area 2 of the food processor 4, which detects a contact between a preparation vessel 1 and the receiving area 2, and then automatically initiates an operation of the electric motor 31, which rotates the activating element 29 of the activating assembly 7 of the food processor 4. This causes the locking ring 8 of the preparation vessel 1 to rotate. Proceeding from the state shown on FIG. 9, the hooked counter-elements 15 of the receiving area 2 grip over the projections 10 of the locking ring 8 as the locking ring continues to rotate 8, and securely lock the preparation vessel with the food processor 4. It now is possible to operate the food processor 4 even at high speeds of the agitator, without the danger of the preparation vessel 1 tilting or rattling.

Locking the locking ring 8 with the counter-elements 15 of the base unit 3 is facilitated by a wedge-shaped end face (relative to the rotational direction) of the projection 10 or counter-element 15. Such a wedge shape on the contact surfaces allows a reliable intermeshing of the opposing contours of the projection 10 and counter-element 15. In addition, the locking force can thereby also be further increased along a ramp, until a connection free of play is ultimately created between the preparation vessel 1 and the receiving area 2 of the food processor 4. In order to unlock the preparation vessel, the locking ring 8 is then rotated in the opposite direction again, so that the form closure between the projection 10 and the corresponding counter-element 15 is canceled.

FIGS. 12 to 18 show additional embodiments of preparation vessels 1 according to the invention, which apart from a locking assembly 5 for locking the preparation vessel 1 to the base unit 3 of the food processor 4 further also have a cover locking assembly 14 for locking the pot 11 of the preparation vessel 1 with the cover 13. FIGS. 12 to 16 show a first embodiment of such a cover locking assembly 14, while FIGS. 17 and 18 each show further embodiments.

The cover locking assembly 14 according to FIGS. 12 and 13 has a pivotable functional element 17, which is mounted on a pivot axis 28 arranged on the pot 11 of the preparation vessel 1. On the one hand, the functional element 17 is mechanically connected with a locking ring 8 of the preparation vessel 1, which is rotatably mounted on an outer wall of the pot 11, and on the other hand, the functional element 17 is mechanically operatively connected with a likewise ring-shaped cover locking element 24, which is rotatably mounted on the pot 11 in the peripheral direction of a pot opening 12. A rotation of the locking ring 8 is accompanied simultaneously by a pivoting of the functional element 17 around the pivot axis 28, as a result of which the cover locking element 24 is rotated along the periphery of the pot opening 12. During the rotation of the cover locking element 24, a slider 37 of the cover locking element 24 acts on a corresponding counter-contour 35 of the cover 13, and rotates it relative to the pot 11. The rotation of the cover 13 produces a bayonet connection between locking projections 34 of the pot 11 and locking contours 18 of the cover 13. The cover 13 is then securely locked with the pot 11. This is shown from outside on FIG. 15. The activating device 7 of the food processor 4 thus serves to drive the locking assembly 5 on the one hand, and to activate the cover locking assembly 14 on the other. The rotational motion of the locking ring 8 is here converted by means of the pivotable functional element 17 into a rotational motion of the cover locking element 24 as well. It is here especially advantageous that the functional element 17 be integrated into the wall 20 of the pot 11 or into the pot handle 21, so as to create a smooth surface of the preparation vessel 1 from outside, which is easy to clean. In this sense, it is also especially recommended that the functional element 17 consist of an elastic material and can abut against the shape of the pot 11 during the pivoting motion. As a result, the functional element 17 can abut against the outer wall of the pot 11 correspondingly in terms of shape in each pivoting position, for example within a cavity of the wall 20 of the pot 11. A current rotational position of the cover 13—and hence also its locking state—can be detected via end stops, which limit the range of motion of the cover 13, and hence also of the cover locking element 24. Whether the cover 13 was correctly locked or not can also be verified by evaluating a rotational angle of the activating element 29 of the activating assembly 7 of the food processor 4.

Figure 17:
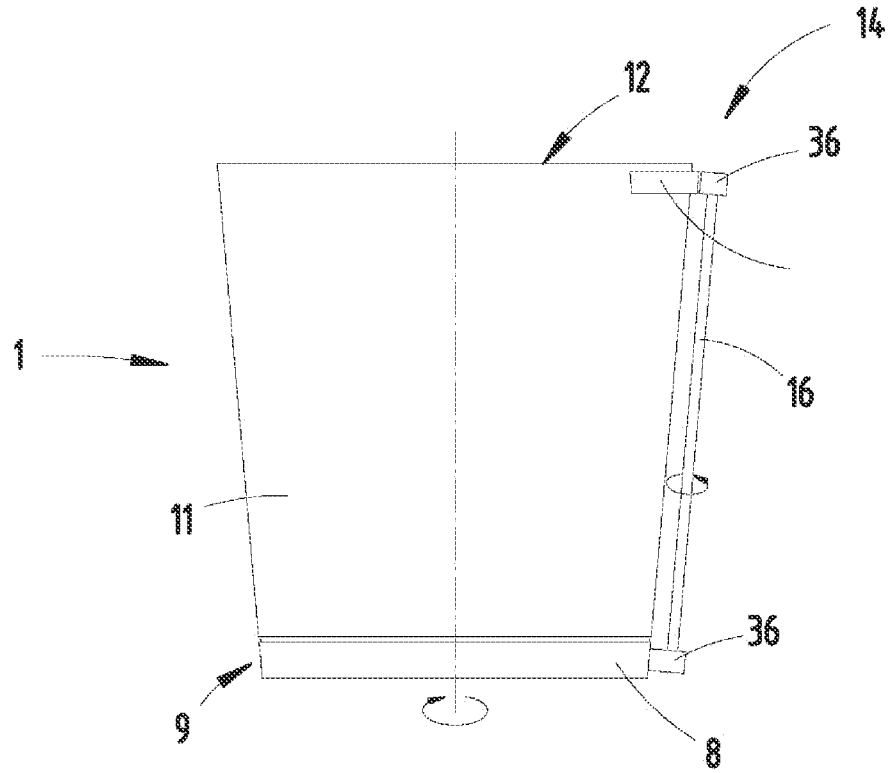
FIG. 17 is a preparation vessel with a cover locking assembly according to an alternative embodiment.
Figure 18:
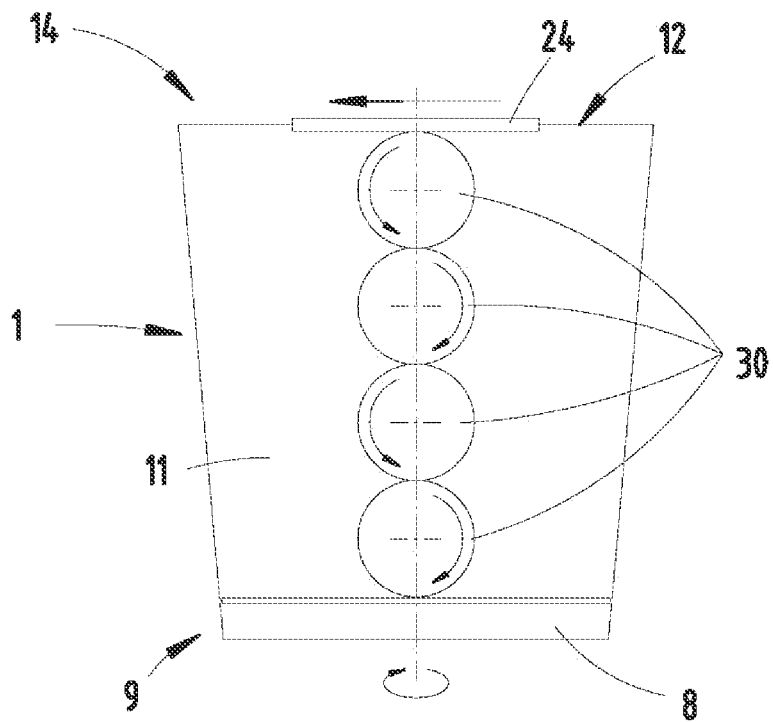
FIG. 18 is a preparation vessel with a cover locking assembly according to an alternative embodiment.

FIGS. 17 and 18 show alternative embodiments of a preparation vessel 1 with a cover locking assembly 14. The cover locking assembly 14 according to FIG. 17 has a rotating shaft 16, which protrudes from a locking ring 8 arranged on a pot foot 9 of the preparation vessel 1 up to a pot opening 12 of the pot 11. In the area of the pot opening 12, the rotating shaft 16 has a tooth element 36, which interacts with a tooth system of a cover locking element 24. A rotation of the locking ring 8 is accompanied by a rotation of the rotating shaft 16, and hence by a transmission of the rotational motion to the cover locking element 24, for example which rotates a cover 13 relative to the pot 11 of the preparation vessel 1, as explained previously with reference to FIGS. 12 to 16.

FIG. 18 shows an alternative embodiment, in which the rotational motion of a locking ring 8 is transmitted to a cover locking element 24 via several, here for example four, transmission elements 30. For example, the transmission elements 30 can be toothed wheels, wherein adjacent toothed wheels rotate in opposite directions.

Although only a few embodiments of the present invention have been shown and described, it is to be understood that many changes and modifications may be made thereunto without departing from the spirit and scope of the invention.

Reference List
1 Preparation vessel 28 Pivot axis
2 Receiving area 29 Activating element
3 Base unit 30 Transmission element
4 Food processor 31 Electric motor
5 Locking assembly 32 Passage opening
6 Contact element 33 Housing opening
7 Activating assembly 34 Locking projection
8 Locking ring 35 Counter-contour
9 Pot foot 36 Tooth element
10 Projection 37 Slider
11 Pot
12 Pot opening
13 Cover
14 Cover locking assembly
15 Counter-element
16 Rotational shaft
17 Functional element
18 Locking contour
19 Cover opening
20 Wall
21 Pot handle
22 Display
23 Switch
24 Cover locking element
25 Fastening element
26 Groove
27 Ring

What is claimed is:

1. An electric motor-driven food processor in the form of a mixing device, comprising a base unit having an activating assembly, and a preparation vessel configured for connection with a receiving area of the base unit, the preparation vessel having a locking assembly configured for locking the preparation vessel with the base unit of the food processor, wherein the locking assembly comprises a locking ring with a displaceable contact element, wherein the locking ring is mounted on the preparation vessel so as to be rotatable in a peripheral direction of the preparation vessel, and wherein the displaceable contact element is arranged on the preparation vessel so that the displaceable contact element can be activated by a corresponding activating assembly of the receiving area of the food processor when the preparation vessel is in a state properly connected with the base unit, so as to induce the locking of the preparation vessel by rotating the locking ring of the locking assembly.

2. The electric motor-driven food processor according to claim 1, wherein the locking ring is arranged on a bottom side of the preparation vessel.

3. The electric motor-driven food processor according to claim 1, wherein the locking ring has at least one projection, which is configured to engage behind a corresponding counter-element of the base unit of the food processor, so as to lock the preparation vessel with the base unit.

4. The electric motor-driven food processor according to claim 1, wherein the displaceable contact element is a tooth system of the locking ring.

5. The electric motor-driven food processor according to claim 1, wherein the preparation vessel further comprises a pot, a cover that closes a pot opening of the pot, and a cover locking assembly for locking the pot with the cover, wherein the cover locking assembly is mechanically operatively connected with the locking assembly in such a way that activating the locking assembly causes the cover locking assembly to be activated.

6. The electric motor-driven food processor according to claim 5, wherein the cover locking assembly has a functional element that is pivotably connected with the locking ring of the locking assembly, and is guided from the locking ring to the pot opening, or wherein the cover locking assembly has a rotating shaft that is driven by the locking ring, and is guided from the locking ring to the pot opening.

7. The electric motor-driven food processor according to claim 5, wherein the cover locking assembly has a cover locking element that is designed to engage behind a partial area of the cover and/or displace the cover relative to the pot, and thereby bring about a locking of the pot with the cover.

8. The electric motor-driven food processor according to claim 6, wherein the functional element or rotating shaft has a predominately longitudinal extension, and wherein the functional element or rotating shaft is guided via a wall of the pot and/or a pot handle of the pot.

* * * * *

UNITED STATES PATENT AND TRADEMARK OFFICE
CERTIFICATE OF CORRECTION

PATENT NO. : 11,957,275 B2
APPLICATION NO. : 17/190784
DATED : April 16, 2024
INVENTOR(S) : Sebastian Jansen et al.

It is certified that error appears in the above-identified patent and that said Letters Patent is hereby corrected as shown below:

On the Title Page

Column 1, Item (73) Assignee please change:
"Vorwerk &Co., Interholding GmbH, Wupperal (DE)"

To correctly read:
-- Vorwerk & Co. Interholding GmbH, Wuppertal (DE)" --

Signed and Sealed this
Twenty-ninth Day of October, 2024

*Katherine Kelly Vidal*
Katherine Kelly Vidal
*Director of the United States Patent and Trademark Office*